(12) United States Patent
Tsumeda et al.

(10) Patent No.: US 9,905,372 B2
(45) Date of Patent: Feb. 27, 2018

(54) ELECTROCHEMICAL CAPACITOR

(71) Applicant: NIPPON CHEMI-CON CORPORATION, Tokyo (JP)

(72) Inventors: Satoru Tsumeda, Tokyo (JP); Kazuma Okura, Tokyo (JP); Kazunori Takaki, Tokyo (JP); Shuichi Ishimoto, Tokyo (JP)

(73) Assignee: NIPPON CHEMI-CON CORPORATION, Tokyo (JP)

( * ) Notice: Subject to any disclaimer, the term of this patent is extended or adjusted under 35 U.S.C. 154(b) by 0 days.

(21) Appl. No.: 14/912,810

(22) PCT Filed: Aug. 11, 2014

(86) PCT No.: PCT/JP2014/071213
§ 371 (c)(1),
(2) Date: Feb. 18, 2016

(87) PCT Pub. No.: WO2015/025764
PCT Pub. Date: Feb. 26, 2015

(65) Prior Publication Data
US 2016/0196930 A1    Jul. 7, 2016

(30) Foreign Application Priority Data

Aug. 19, 2013 (JP) ................. 2013-170007

(51) Int. Cl.
*H01G 11/30* (2013.01)
*H01G 11/46* (2013.01)
(Continued)

(52) U.S. Cl.
CPC ............ *H01G 11/32* (2013.01); *H01G 11/06* (2013.01); *H01G 11/46* (2013.01); *H01G 11/50* (2013.01);
(Continued)

(58) Field of Classification Search
CPC ......... H01G 11/06; H01G 11/24; H01G 11/30
See application file for complete search history.

(56) References Cited

U.S. PATENT DOCUMENTS

| 2002/0172865 A1* | 11/2002 | Che ............... H01G 11/06 429/231.1 |
| 2013/0063867 A1* | 3/2013 | Naoi ................. B82Y 30/00 361/505 |

FOREIGN PATENT DOCUMENTS

| JP | 10-270293 A | 10/1998 |
| JP | 2002-270175 A | 9/2002 |

(Continued)

OTHER PUBLICATIONS

International Search Report, issued in PCT/JP2014/071213, dated Nov. 18, 2014.
(Continued)

*Primary Examiner* — Eric Thomas
(74) *Attorney, Agent, or Firm* — Birch, Stewart, Kolasch & Birch, LLP

(57) ABSTRACT

Provided is an electrochemical capacitor which has low DC internal resistance, and which minimizes increase in the DC internal resistance due to a high temperature experience. The electrochemical capacitor is provided with a positive electrode having a positive electrode active material layer containing activated carbon, a negative electrode having a negative electrode active material layer containing a spinel-type lithium titanate, and a separator holding a non-aqueous electrolytic solution containing a lithium salt between the positive electrode active material layer and the negative electrode active material layer, a 100% discharge capacity of lithium titanate being set to within a range of 2.2 to 7.0 times a 100% discharge capacity of activated carbon. During charging and discharging of the electrochemical capacitor, (Continued)

only the area near the surfaces of lithium titanate particles are utilized, lowering the DCIR and improving the stability of the DCIR.

1 Claim, 3 Drawing Sheets

(51) Int. Cl.
    *H01G 11/06*     (2013.01)
    *H01G 11/32*     (2013.01)
    *H01G 11/50*     (2013.01)
    *H01G 11/34*     (2013.01)
    *H01G 11/52*     (2013.01)

(52) U.S. Cl.
    CPC .............. *H01G 11/34* (2013.01); *H01G 11/52* (2013.01); *Y02E 60/13* (2013.01)

(56) References Cited

FOREIGN PATENT DOCUMENTS

| | | |
|---|---|---|
| JP | 2003-132945 A | 5/2003 |
| JP | 2004-221523 A | 8/2004 |
| JP | 2008-270795 A | 11/2008 |
| JP | 2011-213556 A | 10/2011 |
| JP | 2011-216747 A | 10/2011 |
| JP | 2011-216748 A | 10/2011 |
| JP | 2011-216749 A | 10/2011 |
| JP | 2012-146763 A | 8/2012 |

OTHER PUBLICATIONS

Written Opinion of the International Searching Authority, issued in PCT/JP2014/071213(PCT/ISA/237), dated Nov. 18, 2014.

* cited by examiner

ELECTROCHEMICAL CAPACITOR

TECHNICAL FIELD

The present invention relates to an electrochemical capacitor which uses activated carbon for a positive electrode and a spinel-type lithium titanate ($Li_4Ti_5O_{12}$) (hereinafter simply referred to as "lithium titanate") for a negative electrode.

THE RELATED ART

In an electric double layer capacitor with a positive electrode and a negative electrode that are mainly composed of activated carbon, charging and discharging take place by desorption/adsorption of a cation and an anion in an electrolytic solution from/onto the activated carbon. The electric double layer capacitor is advantageous in that rapid charge/discharge is possible and it has excellent output characteristics as well as excellent charge-discharge cycle characteristics, but it also has an issue in that its energy density is low. On the other hand, in a lithium ion secondary battery where a material which can occlude and release a lithium ion is used as a positive electrode active material and a negative electrode active material, a lithium ion is released from the positive electrode and occluded into the negative electrode by charge, and a lithium ion is released from the negative electrode and occluded into the positive electrode by discharge. Compared with the electric double layer capacitor, the lithium ion secondary battery is advantageous in that it can be activated at a higher voltage and has a bigger energy density, but it also has issues in that rapid charging/discharging is difficult and its charge-discharge cycle is unreliable.

Therefore, as an electrical storage device that draws on the advantages of the two devices, an electrochemical capacitor that uses activated carbon for a positive electrode and a material that can occlude and release a lithium ion for a negative electrode is suggested, and usage of lithium titanate as the negative electrode active material is considered. An electrochemical capacitor that stably operates is expected to be obtained because a solid electrolyte interface (SEI) film is less likely to be formed on the surface of lithium titanate, lithium dendrite is not precipitated, and its volume is nearly unchanged when a lithium ion is adsorbed/desorbed from/onto lithium titanate.

For example, Patent Document 1 (JP 2002-270175 A) discloses an electrochemical capacitor that has a positive electrode containing activated carbon, a negative electrode containing lithium titanate and an organic electrolytic solution containing a lithium salt, and that can operate within the range of 1.5 V to approximately 2.7 V. To obtain stable cycling characteristics, it is necessary that the operating electric potential of the negative electrode is not 1.0 V or less against $Li/Li^+$ in which the electrolytic solution is decomposed, and to this end, it is deemed preferable that the capacity ratio of the negative electrode and the positive electrode (that is, the capacity of the negative electrode/the capacity of the positive electrode) is set within the range of 1.05 to 1.3. The quantity of the activated carbon in the positive electrode and the quantity of the lithium titanate in the negative electrode are adjusted to ensure the above-mentioned capacity ratio. Patent Document 2 (JP 2003-132945 A) discloses an electrochemical capacitor that has an organic solvent electrolytic solution containing a lithium salt and a quaternary onium salt, a positive electrode containing activated carbon, and a negative electrode containing lithium titanate, and that can operate within the range of 1.5 V to approximately 3.1 V. By including the lithium salt and the onium salt in the electrolytic solution, the electric conductivity of the electrolytic solution can be heightened, and the capacity density at large-current discharge can be amplified. In this document, it is deemed preferable that the capacity ratio of the negative electrode and the positive electrode (that is, the capacity of the negative electrode/the capacity of the positive electrode) is within the range of 1.05 to 1.08.

Also, as an electrochemical capacitor that exhibits an excellent rate characteristic with restrained decrease in capacity at the time of large-current discharge, an electric capacitor in which a composite material of a lithium titanate nanoparticle and conductive carbon is used for a negative electrode has been suggested. In this description, a "nanoparticle" is a particle with a diameter of 100 nm or less in the case of a spherical particle, or a particle with a cross-sectional diameter (the minor axis) of 100 nm or less in the case of a needle-shape, tubular or fibrous particle. A nanoparticle can be either an initial particle or a secondary particle.

Patent Document 3 (JP 2008-270795 A) discloses a method to manufacture a composite material in which a nanoparticle of lithium titanate is supported on the surface of conductive carbon by introducing a reaction solution containing a titanium alkoxide, a lithium compound, a reaction inhibitor such as acetic acid that forms a complex with the titanium alkoxide and the conductive carbon to a rotatable reactor, rotating the reactor so that shearing stress and centrifugal force are added to the reaction solution so that the conductive carbon is dispersed and a chemical reaction is facilitated, resulting in the precipitation of a lithium titanate precursor on the conductive carbon in a highly dispersed manner, and then by heating the conductive carbon on which the obtained precursor is supported and transforming the precursor into lithium titanate on the conductive carbon, and describes an electrochemical capacitor in which the obtained composite material is used for a negative electrode. Also, Patent Document 4 (JP 2011-213556 A) discloses a method to manufacture a composite material containing a nanoparticle of lithium titanate in which nitrogen is doped, by making a lithium titanate precursor supported on conductive carbon by means of a chemical reaction while adding shearing stress and centrifugal force and then heating a product obtained in nitrogen, and describes an electrochemical capacitor in which the obtained composite material is used for a negative electrode. Patent Document 5 (JP 2011-216747 A), Patent Document 6 (JP 2011-216748 A), Patent Document 7 (JP 2011-216749 A) and Patent Document 8 (JP 2012-146763 A) disclose suitable embodiments of electrochemical capacitors in which the above-mentioned composite material containing a nanoparticle of lithium titanate in which nitrogen is doped is used for a negative electrode.

PRIOR ARTS DOCUMENTS

Patent Documents

Patent Document 1: JP 2002-270175 A
Patent Document 2: JP 2003-132945 A
Patent Document 3: JP 2008-270795 A
Patent Document 4: JP 2011-213556 A
Patent Document 5: JP 2011-216747 A
Patent Document 6: JP 2011-216748 A
Patent Document 7: JP 2011-216749 A
Patent Document 8: JP 2012-146763 A

SUMMARY OF THE INVENTION

Problems to Be Solved By the Invention

An electrochemical capacitor requires a low direct current internal resistance (DCIR). Especially, if it is used for energy regeneration in automobiles and construction equipment, the energy regeneration is conducted at a high current, where a high DCIR causes energy loss due to heat generation and lower storage efficiency. Also, the heat generation shortens the life span of the electrochemical capacitor. However, the reduction in DCIR has not been fully considered in the case of a conventional electrochemical capacitor. Also, a low DCIR should be maintained even if a capacitor is subjected to a high temperature.

Therefore, the objective of the present invention is to provide an electrochemical capacitor that uses activated carbon for a positive electrode and lithium titanate for a negative electrode, and which has a low DCIR and which can inhibit an increase in DCIR after a high temperature is experienced.

Means for Solving the Problem

The inventors, after keen examination, discovered that the above-mentioned objective is realized when an electrochemical capacitor is composed by making a 100% discharge capacity of lithium titanate in a negative electrode significantly larger than a 100% discharge capacity of active carbon in a positive electrode, and completed the present invention.

Therefore, the electrochemical capacitor of the present invention with a positive electrode which has a positive electrode active material layer having activated carbon, a negative electrode which has a negative electrode active material layer having lithium titanate, and a separator which is placed between the positive electrode active material layer and the negative electrode active material layer and holds a non-aqueous electrolytic solution having a lithium salt is characterized by the fact that a 100% discharge capacity of lithium titanate is 2.2 to 7.0 times a 100% discharge capacity of activated carbon.

In the electrochemical capacitor of this invention, the 100% discharge capacity by unit mass of lithium titanate and the 100% discharge capacity by unit mass of activated carbon are checked and the mass of activated carbon and the mass of lithium titanate are adjusted so that the 100% discharge capacity of lithium titanate is 2.2 to 7.0 times the 100% discharge capacity of activated carbon. The 100% discharge capacity by unit mass of lithium titanate and the 100% discharge capacity by unit mass of activated carbon refer to the values calculated by the following method. A working electrode with a negative electrode active material layer having lithium titanate and a lithium counter electrode are combined through a separator having an electrolytic solution which is to be used in the capacitor to form a half-cell, charging/discharging are performed within the range of 3.0 to 1.0 V versus $Li/Li^+$ at the rate of 1 C, and the discharge capacity per gram of lithium titanate during the charging/discharging is set as the 100% discharge capacity by unit mass of lithium titanate. Also, a working electrode with a positive electrode active material layer having activated carbon and a lithium counter electrode are combined through a separator having an electrolytic solution which is to be used in the capacitor to form a half-cell, charging/discharging are performed within the range of 4.3 to 3 V versus $Li/Li^+$ at the rate of 1 C, and the discharge capacity per gram of activated carbon during the charging/discharging is set as the 100% discharge capacity by unit mass of activated carbon.

FIG. 1 shows a model concerning an example in which the negative electrode active material layer in the electrochemical capacitor of this invention is composed of carbon nanofiber and a lithium titanate nanoparticle. The charge/discharge capacity of activated carbon and the charge/discharge capacity of lithium titanate when an electrochemical capacitor of this invention is repeatedly charged/discharged are the same. However, because the 100% discharge capacity of lithium titanate is set within the range of 2.2 to 7.0 times the 100% discharge capacity of activated carbon, only 14 (=1/7.0) to 45 (=1/2.2) % of the particles of lithium titanate are used in the repetition of charging/discharging against the 100% charging/discharging of activated carbon. The area "a" near the surface layer of the lithium titanate particles in FIG. 1 shows the area that is used for this charging/discharging. The lithium ions have only to be diffused in the area "a" during the charging/discharging and the DCIR resulting from the diffusion of the lithium ions is decreased because the diffusion distance is shortened. The ratio of lithium titanate utilized in the repetition of charging/discharging is hereinafter referred to as the "utilization ratio."

Based on the inventors' consideration, it was found that, if an electrochemical capacitor was composed by significantly increasing the 100% discharge capacity of lithium titanate compared to the 100% discharge capacity of activated carbon, the DCIR was lowered and an increase in DCIR was unexpectedly inhibited even after the electrochemical capacitor was exposed to a high temperature. The reason for this is not clear at this moment, but it is considered that the reactivity of the surface of a lithium titanate particle decreases as the utilization ratio of lithium titanate decreases, and an SEI film, which would likely be formed on the particle surface at a high temperature, is less likely to form as the utilization rate decreases, and the inhibition of the intercalation of a lithium ion by the SEI film is less likely to occur so that the increase in DCIR after a high temperature is experienced is inhibited.

In the present invention, the 100% discharge capacity of lithium titanate is within the range of 2.2 to 7.0 times the 100% discharge capacity of activated carbon; in other words, the utilization ratio of lithium titanate is within the range of 14 to 45%. When the utilization ratio of lithium titanate exceeds 45%, the increase in DCIR becomes remarkable, and a change in DCIR due to a high temperature experience becomes remarkable. When the utilization ratio of lithium titanate is less than 14%, a decrease in DCIR can no longer be expected and the capacity per volume of an electrochemical capacitor product decreases.

If the diameter of a lithium titanate particle is of a micron order or a submicron order, the effect of the present invention can be obtained, but it is preferable that the lithium titanate particle is nano-sized. Since the nanoparticle has a remarkably large surface area by mass, the diffusion distance of a lithium ion in charging/discharging is further shortened and the decrease in DCIR becomes more remarkable. Also, it is more likely that an SEI film will be formed at a high temperature if the surface area of lithium titanate is larger, but in this invention, a change in DCIR after a high temperature is experienced is suitably controlled even though the surface area of the nanoparticle is remarkably large. Also, if lithium titanate is a nanoparticle, an electrochemical capacitor that exhibits an excellent rate characteristic with restrained capacity decrease even in discharging at a large electric current can be obtained.

Advantageous Effects of the Invention

The electrochemical capacitor of the present invention in which the 100% discharge capacity of lithium titanate is set within the range of 2.2 to 7.0 times the 100% discharge capacity of activated carbon has a low DCIR and shows stable characteristics with a restrained DCIR increase after a high temperature is experienced.

DETAILED DESCRIPTION OF THE INVENTION

Figure 1:
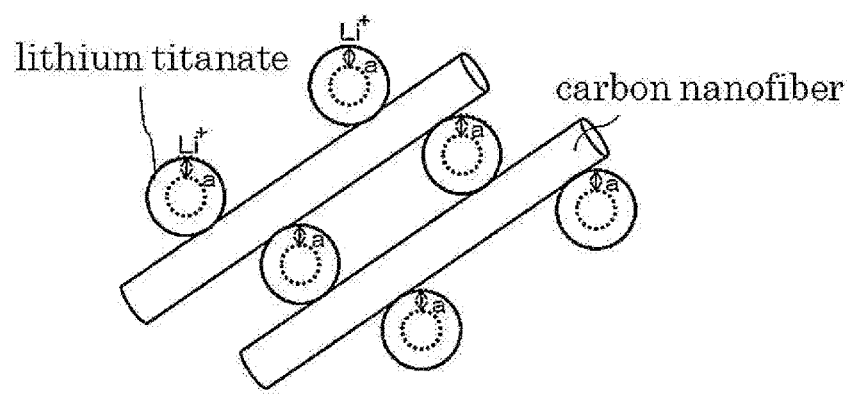
FIG. 1 shows a model concerning an example in which a negative electrode active material layer in an electrochemical capacitor of the present invention is composed of carbon nanofiber and a lithium titanate nanoparticle.

An electrochemical capacitor of the present invention comprises a positive electrode which has a positive electrode active material layer having activated carbon, a negative electrode which has a negative electrode active material layer having lithium titanate and a separator which is placed between the positive electrode active material layer and the negative electrode active material layer and holds a non-aqueous electrolytic solution having a lithium salt, and the 100% discharge capacity of lithium titanate is within 2.2 to 7.0 times the 100% discharge capacity of activated carbon.

The negative electrode has the negative electrode active material layer having lithium titanate and an electrical collector to support the negative electrode active material layer. The negative electrode active material layer can be produced by dispersing lithium titanate and a conductive agent as needed in a solvent in which a binder is dissolved as needed, coating the dispersion obtained on the electrical collector by doctor blade method etc. and drying the dispersion. Also, the dispersion obtained can be formed in a given shape and be crimped on the electrical collector.

As a solvent to form the above-mentioned dispersion, a water solvent or a non-aqueous solvent such as N-methyl-2-pyrrolidone, dimethyl formamide, dimethylacetamide, methyl ethyl ketone, cyclohexanone, methyl acetate, methyl acrylate, diethyltriamine, N,N-dimethylaminopropylamine, ethylene oxide and tetrahydrofuran can be used, but it is preferable to use a non-aqueous solvent. The solvent can be used alone, or more than one kind of solvent can be used in a mixture.

As a binder to form the above-mentioned dispersion, a heretofore known binder such as polytetrafluoroethylene, polyvinylidene fluoride, tetrafluoroethylene-hexafluoropropylene copolymer, vinylidene fluoride-hexafluoropropylene copolymer, polyvinyl fluoride, carboxymethylcellulose, nitrocellulose, styrene-butadiene rubber or acrylonitrile-butadiene rubber can be used. Also, a nitrile-based polymer that contains 80% or more by mass of a repeat unit that derives from a monomer having a nitrile group is a preferable binder because the polymer has a low electrolyte swellability and excellent adhesiveness between particles in the negative electrode active material or between the negative electrode active material layer and the electrical collector; therefore, the polymer is able to densify lithium titanate in the negative electrode active material layer and decrease DCIR in the electrochemical capacitor. Examples of the nitrile-based polymer are polyacrylonitrile and polymethacrylonitrile, as well as modified acrylonitrile resin in which acrylonitrile and/or methacrylonitrile are polymerized with acrylic acid, methacrylic acid, acrylic acid ester, methacrylic acid ester and so on. Especially, acrylic acid-methoxytriethyleneglycolacrylate-acrylonitrile terpolymer is preferable. These polymers can be used alone, or two or more kinds of polymer can be mixed and used. The contained amount of the binder is within the range of 1 to 30% by mass, preferably 1 to 5% by mass of the whole dispersion. If the contained amount is 1% by mass or less, the strength of the active material layer is insufficient, and if the contained amount is 30% or more by mass, it will cause inconveniences such as a decrease in the discharge capacity of the negative electrode and excessive DCIR.

As lithium titanate of the negative electrode active material, that which is manufactured in a heretofore known method can be used without any restrictions. For example, a lithium titanate particle can be obtained by mixing titanium dioxide and lithium carbonate or lithium hydroxide so that the mass ratio of titanium and lithium is 5:4, and firing the mixture at 700 to 1000° C. in an atmosphere containing oxygen. Also, a lithium titanate particle can be obtained by processing an aqueous solution containing a lithium salt and a titanium salt by spray dry method etc. so that solvent is evaporated, and firing the mixture obtained. Also, the lithium titanate obtained by these methods can be pulverized and used. The pulverization method can be either wet grinding or dry grinding. Examples of a pulverization machine are a mashing machine, a ball mill, a bead mill, a rod mill, a roller mill, an agitation mill, a planetary mill, a hybridizer, a mechanochemical composite device and a jet mill.

As for the conductive agent, conductive carbon powder including carbon black such as Ketjen Black, acetylene black and channel black, fullerene, carbon nanotube, carbon nanofiber, amorphous carbon, carbon fiber, natural graphite, artificial graphite, graphitized Ketjen Black, and mesoporous carbon can be used. Also, vapor-grown carbon fiber can be used. Especially, acetylene black is a suitable conductive agent to improve the rate characteristic of the electrochemical capacitor; this is probably because the electric conductivity of the active material layer becomes higher. These carbon powders can be used alone, or two or more kinds of powder can be mixed and used.

Also, the composite materials described in Patent Document 3 and Patent Document 4 that are produced through a process to support a lithium titanate precursor on conductive carbon by chemical reaction caused by the addition of shearing stress and centrifugal force are suitably used for the negative electrode active material layer in the electrochemical capacitor of this invention.

As the electrical collector, an electroconductive material such as aluminum, copper, iron, nickel, titanium, steel and carbon can be used. Aluminum or copper, which has high thermal conductivity and electron conductivity is preferable. The form of the electrical collector can be any form, including film, foil, board, net, expanded metal, cylinder, and so on.

Also, by using an electrical collector that has a conductive adhesion layer on the surface, the electrical collector and the negative electrode active material layer can be bonded with the conductive adhesion layer. The conductive adhesion layer can be formed by coating on an electrical collector a composition in which conductive carbon powder or metal powder as a conductive agent and thermosetting resin or thermoplastic resin as a binder are added to a solvent. As the negative electrode active material layer and the electrical collector are electrically connected by the conductive adhesion layer, the DCIR of the electrochemical capacitor will further decrease.

The positive electrode has a positive electrode active material layer having activated carbon and an electrical collector to support the positive electrode active material layer. As the positive electrode active material layer having activated carbon, that which has been used in a conventional electrical double layer capacitor or an electrochemical capacitor can be used without any restriction, and the form of the positive electrode active material layer can be fibrous or sheeted as well as a powder formation. For example, the positive electrode active material layer can be produced by dispersing an activated carbon powder and, as needed, a conductive agent in a solvent in which a binder is dissolved as needed, coating the dispersion obtained on the electrical collector by doctor blade method etc., and drying the dispersion. Also, the dispersion obtained can be formed in a predetermined shape and clamped on the electrical collector.

As a raw material of activated carbon, a pitch material such as petroleum pitch, coal pitch and mesophase pitch, a coke material that can be obtained by heat-treating the pitch material, a plant-based material such as coconut husk and wood powder, a synthetic resin material such as phenolic resin, vinyl chloride resin, resorcinol resin, polyacrylonitrile, polybutyral, polyacetal, polyethylene, polycarbonate and polyvinyl acetate, and carbides thereof can be used.

For activating treatment, alkali activation processing in which potassium hydroxide, sodium hydroxide, lithium hydroxide, cesium hydroxide, rubidium hydroxide and so on are used as an activation agent, chemical activation processing in which zinc chloride, phosphoric acid and so on are used as an activation agent, gas activation processing in which carbon dioxide, air and so on are used as an activation agent, and vapor activation processing in which vapor is used as an activation agent can be used. The alkali activation processing is preferable because it produces activated carbon with a highly developed pore structure.

As a solvent, a conductive agent and a binder to form a dispersion for a positive electrode active material layer, the statement about a solvent, a conductive agent and a binder to form a dispersion for a negative electrode active material layer can be applied.

For the electrical collector for the positive electrode, the statement about the electrical collector for the negative electrode can be applied, but in the positive electrode, an electrical collector with a conductive adhesive layer containing graphite or exfoliated graphite as a conductive agent is suitably used. The operating voltage of the negative electrode is preferably kept around 1.5 V versus $Li/Li^+$, but if graphite and/or exfoliated graphite are contained in the conductive adhesive agent, irreversible capacity appears in the positive electrode that results from an irreversible reaction in which an anion in the electrolytic solution is intercalated mainly between graphite layers of graphite and/or exfoliated graphite in the early-stage charging of the electrochemical capacitor and the depth of charge of lithium titanate in the negative electrode therefore becomes large, so that over-discharge of the negative electrode will be prevented in subsequent reversible charging/discharging of the electrochemical capacitor. This effect of graphite and/or exfoliated graphite can also be obtained by making the positive electrode active material layer a layer having graphite and/or exfoliated graphite together with activated carbon.

In the electrochemical capacitor of the present invention, the 100% discharge capacity per unit mass of lithium titanate and the 100% discharge capacity per unit mass of activated carbon are checked, and the amounts of lithium titanate and activated carbon are adjusted so that the 100% discharge capacity of lithium titanate is 2.2 to 7.0 times the 100% discharge capacity of activated carbon, that is, the utilization ratio of lithium titanate is within 14 to 45%. If the utilization ratio of lithium titanate is more than 45%, the increase in the DCIR becomes remarkable, and change in the DCIR due to the experience of a high temperature becomes remarkable. If the utilization ratio of lithium titanate is less than 14%, a decrease in DCIR can no longer be expected, and the capacity per volume of an electrochemical capacitor product is decreased.

The electrochemical capacitor of this invention has a separator in which a non-aqueous electrolytic solution having a lithium salt is held between the positive electrode active material layer and the negative electrode active material layer. As the separator, a heretofore known separator such as polyolefin fiber nonwoven fabric, glass fiber nonwoven fabric, polyolefin microporous film, and cellulose fiber cloth etc. can be used without any restrictions. As the electrolytic solution to be held in the separator, an electrolytic solution in which an electrolyte is dissolved in a non-aqueous solvent is used, and a heretofore known non-aqueous electrolytic solution can be used without any restrictions.

The solvent of the non-aqueous electrolytic solution has no restrictions; carbonates, ethers, ketones, lactones, nitriles, hydrocarbons, esters, phosphoric ester compounds, and sulfolane compounds can be used, and ethylene carbonate, propylene carbonate, butylene carbonate, dimethylcarbonate, ethyl methyl carbonate, diethyl carbonate, dipropylene carbonate, sulfolane, 3-methyl sulfolane, γ-butyrolactone, acetonitrile, dimethoxyethane, diethoxyethane and a mixture thereof can be suitably used. Especially, a mixed solvent of ethylene carbonate and dimethylcarbonate is a suitable solvent that improves the rate characteristic of the electrochemical capacitor probably because of an increase in the diffusion speed of a lithium ion due to the low viscosity characteristics of the solvent. Also, vinylene carbonate, vinyl ethylene carbonate, propane sultone, butane sultone, ethylene sulfide, and sulfolene can be added to the electrolytic solution to form a stable, robust SEI film on a lithium titanate particle. Especially, vinylene carbonate is a suitable additive.

As a solute of the non-aqueous electrolytic solution, a salt that forms a lithium ion when it is dissolved into an organic electrolytic solution can be used without any restrictions. For example, $LiPF_6$, $LiBF_4$, $LiClO_4$, $LiN(CF_3SO_2)_2$, $LiCF_3SO_3$, $LiC(SO_2CF_3)_3$, $LiN(SO_2C_2F_5)_2$, $LiAsF_6$, $LiSbF_6$, $LiPF_3(C_2F_5)_3$ or a mixture thereof can be suitably used. The concentration of the lithium salt is generally within the range of 0.1 to 2.5 mol/L, preferably 0.5 to 2 mol/L. As a solute of the non-aqueous electrolytic solution, a quaternary ammonium salt or a quaternary phosphonium salt that has a quaternary ammonium cation or a quaternary phosphonium cation can be used in addition to the salt that forms a lithium ion. For example, a salt that is composed of a cation represented by $R^1R^2R^3R^4N^+$ or $R^1R^2R^3R^4P^+$ ($R^1$, $R^2$, $R^3$ and $R^4$ refer to a 1-6C alkyl group) and an anion of $PF_6^-$, $BF_4^-$, $ClO_4^-$, $N(CF_3SO_3)_2^-$, $CF_3SO_3^-$, $C(SO_2CF_3)_3^-$, $N(SO_2C_2F_5)_2$, $AsF_6^-$ or $SbF_6^-$, or a mixture thereof can be suitably used. Especially, the electrolytic solution having the lithium salt and the quaternary ammonium salt is a suitable electrolytic solution that improves the rate characteristic of the electrochemical capacitor probably because the solvation geometry of the solvent is changed and the diffusion speed of a lithium ion becomes higher.

With the present invention, the electrochemical capacitor can be obtained that has a low DCIR and the increase in DCIR is inhibited even if a high temperature is experienced.

EXAMPLES

The present invention is explained with the following examples, but this invention is not limited to the following examples.

(1) Use of a Lithium Titanate Particle of a Micron Order

Example 1

Activated carbon (product name: YP-17, manufacturer: KURARAY CHEMICAL CO., LTD), a styrene-butadiene rubber binder, and Ketjen Black as a conductive agent were dispersed in water at the mass ratio of 8:1:1 and mixed with an agitator, and a slurry was obtained. The slurry obtained was coated on an aluminum foil with a conductive adhesion layer containing graphite according to the thickness prescribed, and was dried. Then, the sheet after drying was punched out so that its area would be 3×4 cm² and was pressed with a roll press, so that a positive electrode was obtained.

Then, 5 g of lithium titanate (product name: LT-106, manufacturer: ISHIHARA SANGYO KAISHA, LTD, median size: 6.9 μm), 4.29 g of a binder composition containing a modified acrylonitrile resin, (product name: LSR-7, manufacturer: HITACHI CHEMICAL co. ltd), and 13 g of N-methylpyrrolidone were mixed with a thin-film swiveling type mixer, and a slurry was obtained. The slurry obtained was coated on an aluminum foil with a conductive adhesion layer containing graphite according to the thickness prescribed, and was dried. Then, the sheet after drying was punched out so that its area would be 3×4 cm² and was pressed with a roll press, so that a negative electrode was obtained.

The above-mentioned positive electrode and the above-mentioned negative electrode were laminated through a cellulose separator, were impregnated by a propylene carbonate electrolytic solution containing 1M $LiBF_4$ and encapsulated by aluminum laminate, so that an electrochemical capacitor was obtained.

Each of the above-mentioned positive electrode and the above-mentioned negative electrode was combined with a Li counter electrode through a separator containing the above-mentioned electrolytic solution and a half-cell was formed, and then the 100% discharge capacity by unit mass of lithium titanate and the 100% discharge capacity by unit mass of activated carbon was calculated. These values were referred to, and the magnification of the 100% discharge capacity of lithium titanate against the 100% discharge capacity of activated carbon was calculated through the mass of activated carbon in the positive electrode of the electrochemical capacitor and the mass of lithium titanate in the negative electrode of the electrochemical capacitor. The magnification was 3.7 (the utilization ratio of lithium titanate: 27%).

For aging, the electrochemical capacitor obtained was charged to 3.0 V at the current of 12 mA, left at 3.0 V for 72 hours and then discharged under the temperature of 60° C. Then, at room temperature, a charge-discharge cycle which includes charging to 2.8 V at the current of 12 mA, keeping at 2.8 V for 30 minutes, and discharging to 1.5 V at the current of 12 mA was conducted twice. The DCIR was calculated based on the decrease in voltage from the beginning of the discharge until a time lapse of one second in the second discharging. Then, a high temperature load test was conducted by applying 2.8 V to the electrochemical capacitor at the temperature of 60° C. for 1000 hours. After the high temperature load test, at room temperature, a charge-discharge cycle which includes charging to 2.8 V at the current of 12 mA, keeping at 2.8 V for 30 minutes, and discharging to 1.5 V at the current of 12 mA was conducted twice. The DCIR was calculated based on the decrease in voltage from the beginning of the discharge until a time lapse of one second in the second discharging, and the change rate of DCIR was derived.

Example 2

The procedure of Example 1 was repeated except that the magnification of the 100% discharge capacity of lithium titanate against the 100% discharge capacity of activated carbon was adjusted to 2.7 (the utilization ratio of lithium titanate: 37%) by adjusting the thickness of a slurry containing lithium titanate applied to an aluminum foil.

Example 3

The procedure of Example 1 was repeated except that the magnification of the 100% discharge capacity of lithium titanate against the 100% discharge capacity of activated carbon was adjusted to 2.2 (the utilization ratio of lithium titanate: 45%) by adjusting the thickness of a slurry containing lithium titanate applied to an aluminum foil.

Example 4

The procedure of Example 1 was repeated except that the magnification of the 100% discharge capacity of lithium titanate against the 100% discharge capacity of activated carbon was adjusted to 5.0 (the utilization ratio of lithium titanate: 20%) by adjusting the thickness of a slurry containing lithium titanate applied to an aluminum foil.

Example 5

The procedure of Example 1 was repeated except that the magnification of the 100% discharge capacity of lithium titanate against the 100% discharge capacity of activated carbon was adjusted to 7.0 (the utilization ratio of lithium titanate: 14%) by adjusting the thickness of a slurry containing lithium titanate applied to an aluminum foil.

Comparative Example 1

The procedure of Example 1 was repeated except that the magnification of the 100% discharge capacity of lithium titanate against the 100% discharge capacity of activated carbon was adjusted to 1.8 (the utilization ratio of lithium titanate: 56%) by adjusting the thickness of a slurry containing lithium titanate applied to an aluminum foil.

Figure 2:
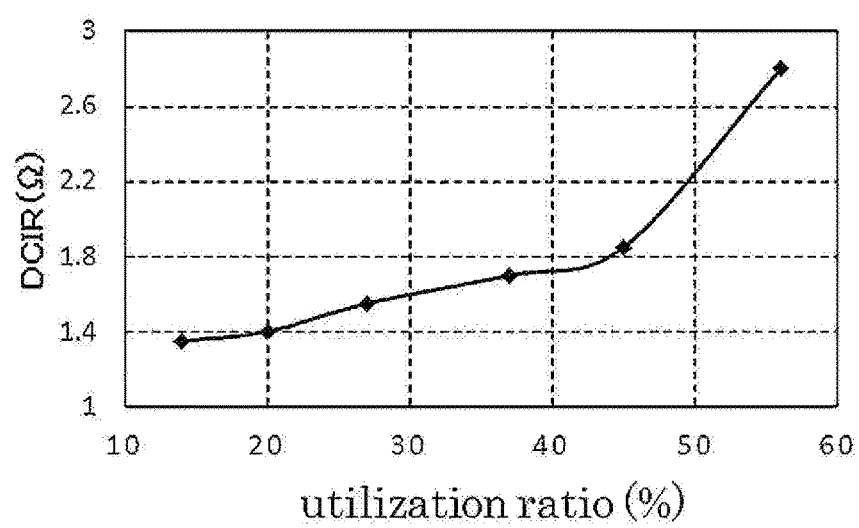
FIG. 2 shows the relationship between the utilization ratio of lithium titanate and DCIR in an electrochemical capacitor with a negative electrode active material layer having a micron-order lithium titanate particle.
Figure 3:
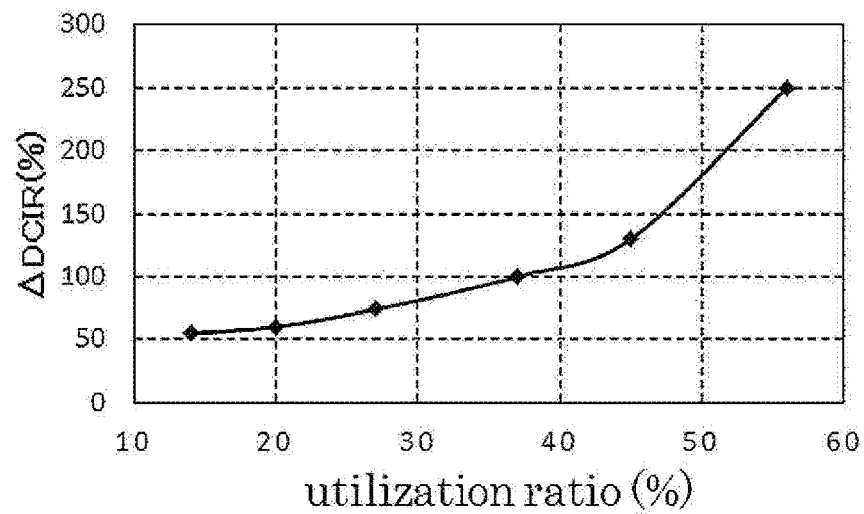
FIG. 3 shows the change in DCIR due to a high temperature load test in an electrochemical capacitor with a negative electrode active material layer having a lithium titanate particle of micron order.

FIG. 2 shows the relationship of the DCIR and the utilization ratio of lithium titanate for the electrochemical capacitors in Examples 1 to 5 and Comparative Example 1. As is evident from FIG. 2, the DCIR sharply increased when the utilization ratio exceeded 45%, and the DCIR gradually declined with the utilization ratio within the range of 14 to 45% as the utilization ratio decreased. FIG. 3 shows the relationship of the change rate of the DCIR before and after the high temperature loading test (ΔDCIR) and the utilization ratio of lithium titanate for the electrochemical capacitors in Examples 1 to 5 and Comparative Example 1. As is evident from FIG. 3, ΔDCIR sharply increased when the utilization ratio exceeded 45%, and the ΔDCIR gradually declined with the utilization ratio within the range of 14 to 45% as the utilization ratio decreased. Therefore, it was found that the electrochemical capacitor in which the DCIR is low and the increase in DCIR is inhibited after a high temperature is experienced is obtained by adjusting the utilization ratio within the range of 14 to 45%.

(2) Use of a Lithium Titanate Nanoparticle

Example 6

The lithium titanate particle of a micron order that was used in Example 1 was wet grinded with a bead mill by using ethanol as a dispersion medium, and a nanoparticle with an average particle diameter of 35 nm was obtained. The average particle diameter of the nanoparticle was derived from the observation of an SEM image. Then, the method of Example 1 was repeated by using the nanoparticle with the average particle diameter of 35 nm instead of the above-mentioned lithium titanate of a micron order. The mass of activated carbon in the positive electrode of the electrochemical capacitor obtained and the mass of lithium titanate in the negative electrode of the electrochemical capacitor obtained were adjusted so that the magnification of the 100% discharge capacity of lithium titanate against the 100% discharge capacity of activated carbon was 3.7 (the utilization ratio of lithium titanate: 27%).

Example 7

The procedure of Example 6 was repeated except that the magnification of the 100% discharge capacity of lithium titanate against the 100% discharge capacity of activated carbon was adjusted to 2.7 (the utilization ratio of lithium titanate: 37%) by adjusting the thickness of a slurry containing lithium titanate applied to an aluminum foil.

Example 8

The procedure of Example 6 was repeated except that the magnification of the 100% discharge capacity of lithium titanate against the 100% discharge capacity of activated carbon was adjusted to 2.2 (the utilization ratio of lithium titanate: 45%) by adjusting the thickness of a slurry containing lithium titanate applied to an aluminum foil.

Example 9

The procedure of Example 6 was repeated except that the magnification of the 100% discharge capacity of lithium titanate against the 100% discharge capacity of activated carbon was adjusted to 5.0 (the utilization ratio of lithium titanate: 20%) by adjusting the thickness of a slurry containing lithium titanate applied to an aluminum foil.

Example 10

The procedure of Example 6 was repeated except that the magnification of the 100% discharge capacity of lithium titanate against the 100% discharge capacity of activated carbon was adjusted to 7.0 (the utilization ratio of lithium titanate: 14%) by adjusting the thickness of a slurry containing lithium titanate applied to an aluminum foil.

Comparative Example 2

The procedure of Example 6 was repeated except that the magnification of the 100% discharge capacity of lithium titanate against the 100% discharge capacity of activated carbon was adjusted to 1.8 (the utilization ratio of lithium titanate: 56%) by adjusting the thickness of a slurry containing lithium titanate applied to an aluminum foil.

Figure 4:
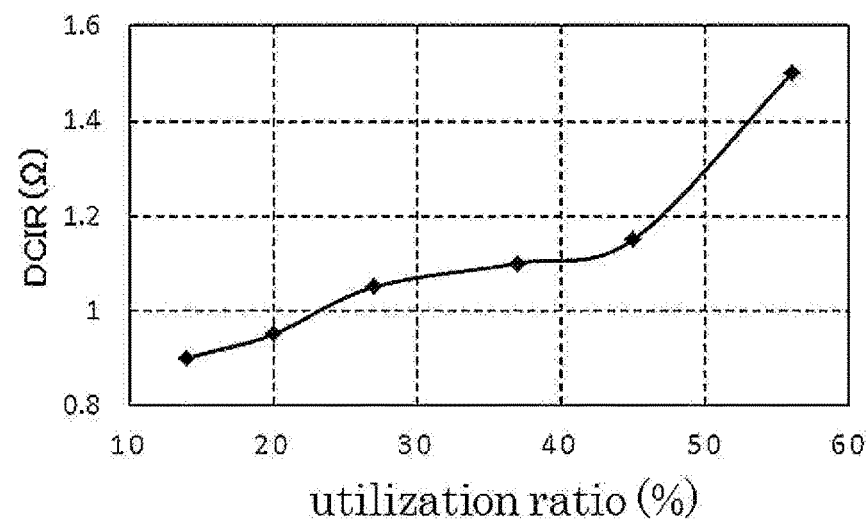
FIG. 4 shows the relationship between the utilization ratio of lithium titanate and DCIR in an electrochemical capacitor with a negative electrode active material layer containing a nanoparticle of lithium titanate.
Figure 5:
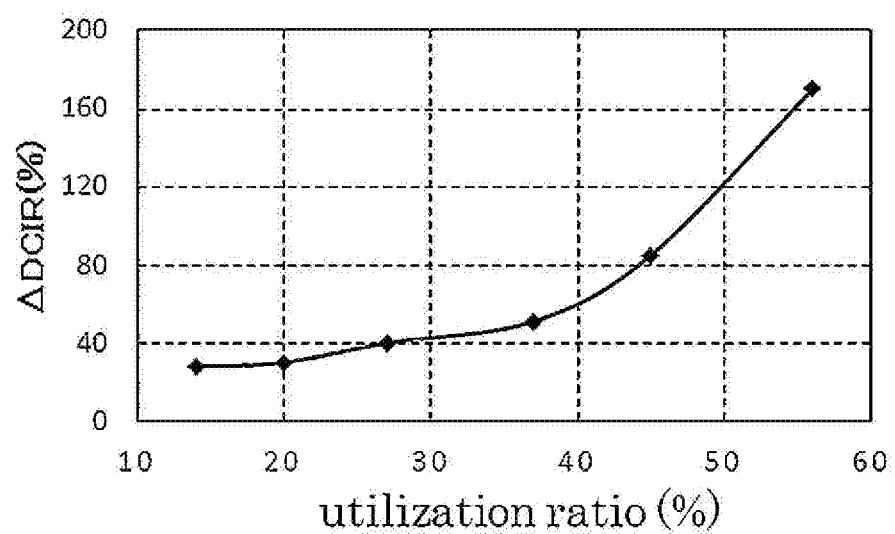
FIG. 5 shows the change in DCIR due to a high temperature load test in an electrochemical capacitor with a negative electrode active material layer containing a nanoparticle of lithium titanate.

FIG. 4 shows the relationship of the DCIR and the utilization ratio of lithium titanate for the electrochemical capacitors in Examples 6 to 10 and Comparative Example 2. As is evident from FIG. 4, even if a nanoparticle of lithium titanate is used, the DCIR sharply increased when the utilization ratio exceeded 45%, and the DCIR gradually declined with the utilization ratio within the range of 14 to 45% as the utilization ratio decreased. FIG. 5 shows the relationship of the change rate of the DCIR before and after the high temperature loading test (ΔDCIR) and the utilization ratio of lithium titanate for the electrochemical capacitors in Examples 6 to 10 and Comparative Example 2. As is evident from FIG. 5, even if a nanoparticle of lithium titanate is used, ΔDCIR sharply increased when the utilization ratio exceeded 45%, and the ΔDCIR gradually declined with the utilization ratio within the range of 14 to 45% as the utilization ratio decreased. Therefore, it was found that an electrochemical capacitor in which the DCIR is low and the increase in DCIR is inhibited after a high temperature is experienced is obtained by adjusting the utilization ratio within the range of 14 to 45%.

From a comparison of FIG. 2 and FIG. 4, the capacitor using a nanoparticle of lithium titanate shows a lower DCIR. This probably reflects the fact that the diffusion length of a lithium ion in charging/discharging became remarkably short by using a nanoparticle of lithium titanate because the surface area of a nanoparticle of lithium titanate by mass is extremely large. Also, as is evident from a comparison of FIG. 3 and FIG. 5, the electrochemical capacitor using a nanoparticle of lithium titanate shows a lower ΔDCIR. It is generally considered that an SEI film is more likely to be formed as the surface area of lithium titanate becomes larger at a high temperature, but it is found that the change in the DCIR due to the experience of a high temperature was suitably inhibited by adjusting the ratio of lithium titanate and activated carbon to the range of the present invention, and a more stable capacitor than a capacitor that uses a lithium titanate particle of a micron order was obtained.

INDUSTRIAL APPLICABILITY

By the present invention, an electrochemical capacitor that has a low, stable DCIR and is especially suited for energy regeneration is offered.

What is claimed is:

1. An electrochemical capacitor comprising:
    a positive electrode with a positive electrode active material layer having activated carbon;
    a negative electrode with a negative electrode active material layer having a spinel-type lithium titanate; and
    a separator holding a non-aqueous electrolytic solution having a lithium salt between the positive electrode active material layer and the negative electrode active material layer,
    wherein a mass of the activated carbon in the positive electrode and a mass of the lithium titanate in the negative electrode are adjusted so that a 100% discharge capacity of the lithium titanate in the negative electrode is within the range of 2.2 to 7.0 times a 100% discharge capacity of the activated carbon in the positive electrode, and
    the lithium titanate in the negative electrode is a nanoparticle having a diameter of 100 nm or less in the case of a spherical particle or a cross-sectional minor axis diameter of 100 nm or less in the case of a needle-shape, tubular or fibrous particle.

* * * * *